(12) United States Patent
Pfeifer

(10) Patent No.: US 12,021,373 B2
(45) Date of Patent: Jun. 25, 2024

(54) OPERATING A LOAD ZONE ON A POWER GRID

(71) Applicant: Siemens Aktiengesellschaft, Munich (DE)

(72) Inventor: Markus Pfeifer, Nuremberg (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 409 days.

(21) Appl. No.: 17/424,930

(22) PCT Filed: May 7, 2019

(86) PCT No.: PCT/EP2019/061666
§ 371 (c)(1),
(2) Date: Jul. 22, 2021

(87) PCT Pub. No.: WO2020/151840
PCT Pub. Date: Jul. 30, 2020

(65) Prior Publication Data
US 2022/0102965 A1 Mar. 31, 2022

(30) Foreign Application Priority Data
Jan. 24, 2019 (EP) .................................... 19153437

(51) Int. Cl.
*H02H 7/22* (2006.01)
*G05B 19/042* (2006.01)
*H02J 13/00* (2006.01)

(52) U.S. Cl.
CPC ............. *H02H 7/22* (2013.01); *G05B 19/042* (2013.01); *H02J 13/0004* (2020.01); *G05B 2219/2639* (2013.01)

(58) Field of Classification Search
None
See application file for complete search history.

(56) References Cited

U.S. PATENT DOCUMENTS

2012/0134058 A1  5/2012  Pamer et al.
2014/0247066 A1  9/2014  Chaintreuil et al.
(Continued)

FOREIGN PATENT DOCUMENTS

WO   WO 2011017721 A1   2/2011
WO   WO 2016017146 A1   2/2016

OTHER PUBLICATIONS

English Translation of WO 2011/017721 A1 (Year: 2011).*
(Continued)

*Primary Examiner* — Ryan A Jarrett
(74) *Attorney, Agent, or Firm* — Harness, Dickey & Pierce, P.L.C.

(57) ABSTRACT

A method and switch module are for operating a load zone on a power grid. In an embodiment of the method, at least one load profile is captured and stored during setup operation of the load zone, documenting a temporal progression of a load zone current or voltage in a time window after closing of the current path. Based on the at least one load profile, a tolerance range for the temporal progression of at least one operating parameter of the load zone in the time window is defined. During normal operation of the load zone, the temporal progression of the at least one operating parameter in the time window after closing the current path is monitored and the load zone is disconnected from the power grid upon the temporal progression of an operating parameter in the time window, after closing the current path, being outside the tolerance range.

26 Claims, 2 Drawing Sheets

(56) References Cited

U.S. PATENT DOCUMENTS

2015/0357972 A1 12/2015 Lespinats et al.
2019/0277915 A1* 9/2019 Hartzsch .............. G01R 31/343

OTHER PUBLICATIONS

PCT International Search Report and Written Opinion of International Searching Authority mailed Oct. 14, 2019 corresponding to PCT International Application No. PCT/EP2019/061666 filed May 7, 2019.

* cited by examiner

OPERATING A LOAD ZONE ON A POWER GRID

PRIORITY STATEMENT

This application is the national phase under 35 U.S.C. § 371 of PCT International Application No. PCT/EP2019/061666 which has an International filing date of May 7, 2019, which claims priority to EP application EP19153437.9 filed Jan. 24, 2019, the entire contents of each of which are hereby incorporated herein by reference.

FIELD

Embodiments of the present application generally relate toto a method and to a switch module for operating a load zone on a power grid, particularly on a DC power grid.

BACKGROUND

A load zone is understood here, and hereinafter, as an individual load or an assembly of a plurality of loads which are connectable to the power grid, in order to be supplied with energy from the power grid and/or to inject energy into the power grid. The connection of a load zone to the power grid must be protected against overcurrents which can occur, for example, as a result of a short circuit or an overload. For example, the connection might be protected by an overcurrent circuit-breaker, in which a characteristic is saved, by which the disconnection of the load zone by the tripping of the overcurrent circuit-breaker is regulated.

SUMMARY

However, the inventors have discovered that a method of this type has a disadvantage, in that disconnection processes can be tripped which, upon a closer analysis of parameters, might have been avoidable. For example, it is conceivable that, in the event of load spikes, extremely short-term overloads can occur which, in response to the predefined characteristic, result in disconnection processes, even though they would have been tolerable, on the grounds of their short duration.

In order to permit the transition of load spikes of this type, time-lag fuses or protective devices featuring a time delay are now employed. However, the inventors have discovered that these operate with a time lag, in order to meet the requirements of future power grids, particularly DC power grids, which require rapid disconnection in the event of a sustained overload, and no disconnection in the event of only a very short-term overload.

At least one embodiment of the application is directed to permitting an improved operation of a load zone on a power grid, particularly with respect to overcurrent protection.

Embodiments of the application are directed to a method, a switch module, and a power grid.

Advantageous configurations of the invention are the subject matter of the claims.

In the method according to at least one embodiment of the invention for operating a load zone on a power grid, a time window is firstly defined and, in a set-up operation of the load zone, at least one load profile is captured and saved, which load profile documents a temporal characteristic of a load zone current flowing in a current path which connects the load zone to the power grid, or of a load zone voltage between an electrical potential of the current path and a reference potential, in the time window further to the closing of the current path. Moreover, based upon the at least one load profile, a tolerance range for the temporal characteristic of at least one operating parameter of the load zone within the time window is defined. During the normal operation of the load zone, the temporal characteristic of the at least one operating parameter, in the time window further to the closing of the current path, is monitored, and the current path is opened if the temporal characteristic of an operating parameter, in the time window further to the closing of the current path, lies outside the tolerance range thereof, or departs from the tolerance range thereof.

A switch module according to at least one embodiment of the invention for operating a load zone on a power grid comprises an actuatable electronic switch unit, a measuring unit, a storage unit, an evaluation unit and a control unit. The electronic switch unit is designed for the opening and closing of a current path between the load zone and the power grid, and is actuatable via the control unit. The measuring unit is designed, in a predefined time window further to the closing of the current path, to capture a temporal characteristic of a load zone current flowing in the current path and/or a temporal characteristic of a load zone voltage between an electrical potential of the current path and a reference potential. The storage unit is designed to save at least one load profile which is captured by the measuring unit, and which documents a temporal characteristic of the load zone current or the load zone voltage in the time window further to the closing of the current path, in a set-up operation of the load zone. The evaluation unit is designed, based upon the at least one load profile, to define a tolerance range for the temporal characteristic of at least one operating parameter of the load zone within the time window. In particular, the evaluation unit can be designed to define at least one tolerance range which is compatible with a safe operating area of the electronic switch unit. The control unit is designed, in the normal operation of the load zone, to monitor the temporal characteristic of each operating parameter for which a tolerance range is defined, and to open the current path by the actuation of the switch unit, if the temporal characteristic of an operating parameter, in the time window further to the closing of the current path, lies outside the tolerance range thereof or departs from the tolerance range thereof.

A power grid according to at least one embodiment of the invention comprises a switch module according to the invention and, in particular, can be a DC power grid.

In the method according to at least one embodiment of the invention for operating a load zone on a power grid, a time window is firstly defined and, in a set-up operation of the load zone, at least one load profile is captured and saved, which load profile documents a temporal characteristic of a load zone current flowing in a current path which connects the load zone to the power grid, or of a load zone voltage between an electrical potential of the current path and a reference potential, in the time window further to the closing of the current path. Moreover, based upon the at least one load profile, a tolerance range for the temporal characteristic of at least one operating parameter of the load zone within the time window is defined. During the normal operation of the load zone, the temporal characteristic of the at least one operating parameter, in the time window further to the closing of the current path, is monitored, and the current path is opened if the temporal characteristic of an operating parameter, in the time window further to the closing of the current path, lies outside the tolerance range thereof, or departs from the tolerance range thereof.

In other words, the method according to at least one embodiment of the invention, in a set-up operation, firstly provides for the learning of the response of a load zone upon the connection thereof to a power grid, wherein at least one load profile is captured and saved which documents a temporal characteristic of a load zone current or a load zone voltage of the load zone, in a time window further to the connection of the load zone to the power grid. Based upon the at least one load profile, a tolerance range for the temporal characteristic of at least one operating parameter of the load zone in the time window is defined. During the subsequent normal operation of the load zone, upon each connection of the load zone to the power grid, each operating parameter for which a tolerance range has been defined will be monitored during the predefined time window further to connection, and the operation of the load zone will be classified as safe if the characteristic of each of these operating parameters remains within its tolerance range. The load zone will only then be disconnected if the characteristic of an operating parameter, within the time window further to the connection of the load zone, lies outside the tolerance range thereof, or departs from the tolerance range thereof.

At least one embodiment of the invention thus permits the definition of load zone-specific tolerance ranges for the operationally secure connection of load zones to a power grid, wherein the tolerance ranges are adapted to load zone-specific load profiles, which are respectively determined for the load zones in a set-up operation. In a particularly advantageous manner, it can thus be prevented that a load zone, upon the connection thereof to a power grid, is disconnected in response to a short-term load spike, which is typical of the latter, even though this disconnection is entirely unnecessary in practice.

As an operating parameter or operating parameters, for which a tolerance range is defined in each case, for example, a current strength of the load zone current, a first derivative of the current strength of the load zone current over time, a magnitude of the load zone voltage and/or a first derivative of the magnitude of the load zone voltage over time is/are employed. These variables are particularly critical operating parameters of a load zone upon the connection of said load zone to a power grid and, accordingly, are particularly appropriate for the definition of tolerance ranges.

As a time window, for example, a time period of less than 100 μs is specified. This takes account of the fact that, typically, load spikes only occur within a very short time interval of 100 μs following the connection of a load zone to a power grid and, in consequence, it is only necessary for tolerance ranges to be defined for this short time interval.

In a further configuration of an embodiment of the method, the current path is opened and closed via an electronic switch unit. This advantageously permits a very rapid isolation of the load zone from the power grid, in the event that the temporal characteristic of an operating parameter, further to the connection of the load zone to the power gird, lies outside the tolerance range thereof, or departs from the tolerance range thereof.

In the event that the current path is opened and closed via an electronic switch unit, preferably at least one tolerance range is defined as compatible with a safe operating area of the electronic switch unit. It can further be provided that a temperature of the electronic switch unit is captured, and at least one tolerance range is defined in accordance with the temperature of the electronic switch unit.

A safe operating area of an electronic switch unit is understood as an operating range for the safe operation of the switch unit. A safe operating area is customarily defined as a region in a current-voltage diagram for a current flowing in the electronic switch unit and a voltage which is present on the electronic switch unit and, accordingly, is particularly appropriate for the definition of a tolerance range for one of the abovementioned operating parameters (current strength of the load zone current, the magnitude of the load zone voltage and the first derivatives thereof over time). By the compatibility of the tolerance range with the safe operating area of the electronic switch unit, it is advantageously prevented that the electronic switch unit is damaged or destroyed by load spikes which are associated with the connection of the load zone to the power grid.

Definition of a tolerance range in accordance with a temperature of the electronic switch unit advantageously permits the influence of temperature upon the functionality of an electronic switch unit to be considered in the definition of the tolerance range.

A switch module according to at least one embodiment of the invention for operating a load zone on a power grid comprises an actuatable electronic switch unit, a measuring unit, a storage unit, an evaluation unit and a control unit. The electronic switch unit is designed for the opening and closing of a current path between the load zone and the power grid, and is actuatable via the control unit. The measuring unit is designed, in a predefined time window further to the closing of the current path, to capture a temporal characteristic of a load zone current flowing in the current path and/or a temporal characteristic of a load zone voltage between an electrical potential of the current path and a reference potential. The storage unit is designed to save at least one load profile which is captured by the measuring unit, and which documents a temporal characteristic of the load zone current or the load zone voltage in the time window further to the closing of the current path, in a set-up operation of the load zone. The evaluation unit is designed, based upon the at least one load profile, to define a tolerance range for the temporal characteristic of at least one operating parameter of the load zone within the time window. In particular, the evaluation unit can be designed to define at least one tolerance range which is compatible with a safe operating area of the electronic switch unit. The control unit is designed, in the normal operation of the load zone, to monitor the temporal characteristic of each operating parameter for which a tolerance range is defined, and to open the current path by the actuation of the switch unit, if the temporal characteristic of an operating parameter, in the time window further to the closing of the current path, lies outside the tolerance range thereof or departs from the tolerance range thereof.

The switch module can further comprise a temperature sensor, which is designed to capture a temperature of the electronic switch unit, and the evaluation unit can be designed to define at least one tolerance range in accordance with the temperature of the electronic switch unit.

A switch module according to at least one embodiment of the invention permits the execution of the method according to at least one embodiment of the invention having the abovementioned advantages.

A power grid according to at least one embodiment of the invention comprises a switch module according to the invention and, in particular, can be a DC power grid.

BRIEF DESCRIPTION OF THE DRAWINGS

The abovementioned properties, features and advantages of the present invention, and the devices whereby these are achieved, will be clarified and elucidated by reference to the following description of example embodiments, which are described in greater detail in conjunction with the drawings. In the drawings.

Mutually corresponding components are identified in the figures by the same reference symbols.

DETAILED DESCRIPTION OF EXAMPLE EMBODIMENTS

Figure 1:
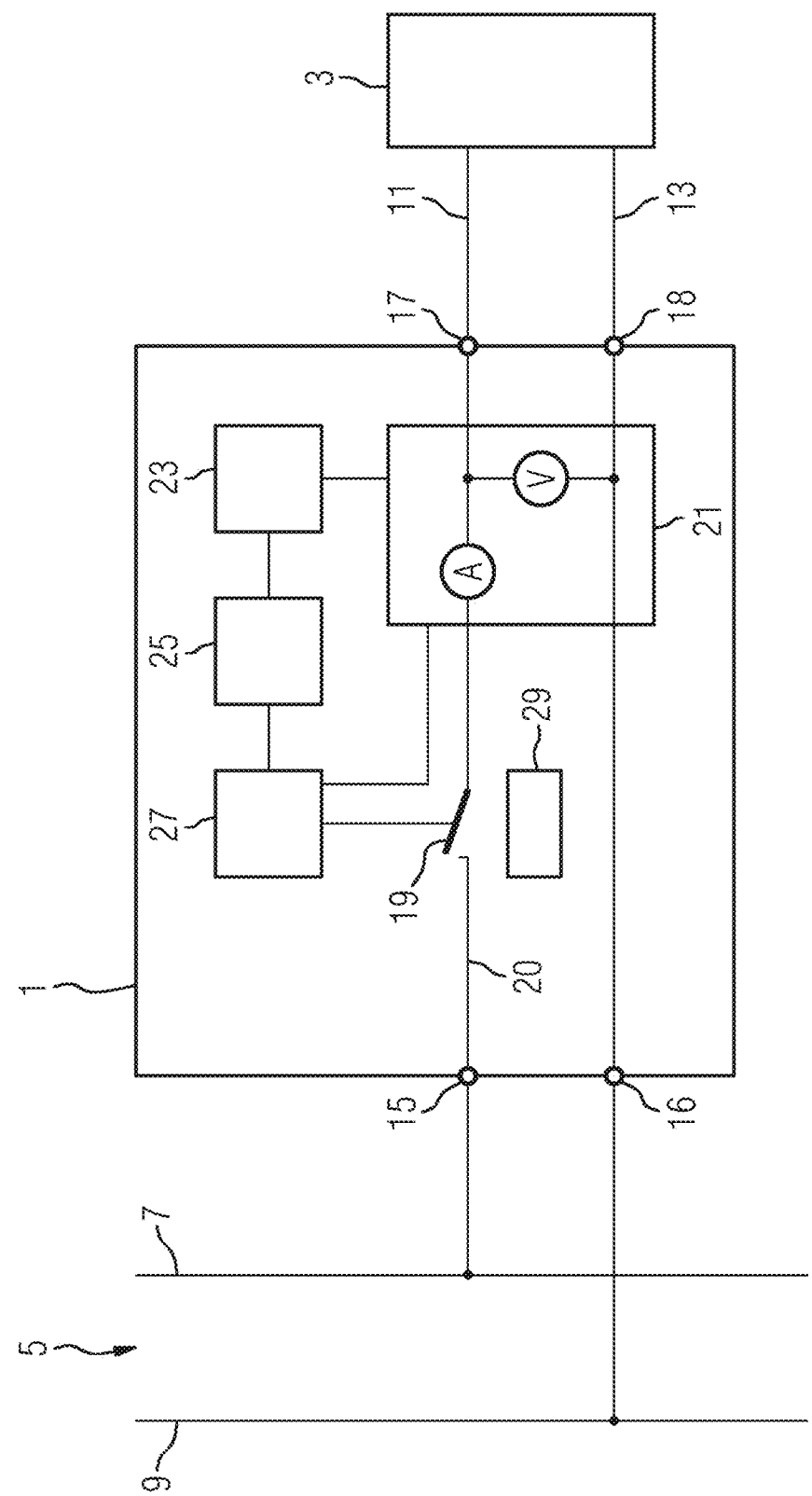
FIG. 1 shows a block circuit diagram of an example embodiment of a switch module according to the invention, by which a load zone is connected to a power grid.

FIG. 1 shows a block circuit diagram of an example embodiment of a switch module 1 according to an embodiment of the invention, by which a load zone 3 is connected to a power grid 5.

The power grid 5 is a DC power grid having two electrical main lines 7, 9, which are at mutually differing DC voltage potentials.

The load zone 3 comprises two load zone lines 11, 13, which are respectively connectable to a main line 7, 9 via the switch module 1.

The switch module 1 comprises two grid-side terminals 15, 16, two load zone-side terminals 17, 18, an actuatable electronic switch unit 19, a measuring unit 21, a storage unit 23, an evaluation unit 25, a control unit 27 and a temperature sensor 29.

The grid-side terminal 15 is connected to the main line 7. The grid-side terminal 16 is connected to the main line 9. The load zone-side terminal 17 is connected to the load zone line 11. The load zone-side terminal 18 is connected to the load zone line 13.

The switch unit 19 is connected between the grid-side terminal 15 and the load zone-side terminal 17, and is designed for the opening and closing of a current path 20 between the load zone 3 and the power grid 5, which connects the load zone line 11 to the main line 7. The switch unit 19 is actuatable via the control unit 27. For example, the switch unit 19 comprises at least one insulated-gate bipolar transistor (IGBT) or metal-oxide-semiconductor field-effect transistor (MOSFET), which is actuatable via the control unit 27.

The measuring unit 21 is designed, in a predefined time window T further to the closing of the current path 20, to capture a temporal characteristic of a load zone current flowing in the current path 20 and a temporal characteristic of a load zone voltage which is present between the load zone lines 11, 13. As a time window T, for example, a time interval is specified which is shorter than 100 μs.

The storage unit 23 is designed to save at least one load profile which is captured by the measuring unit 21, and which documents a temporal characteristic of the load zone current or the load zone voltage in the time window T further to the closing of the current path 20, in a set-up operation of the load zone 3.

The evaluation unit 25 is designed, based upon the at least one load profile, to define a tolerance range 33 for the temporal characteristic of at least one operating parameter C of the load zone 3 in the time window T. In particular, each tolerance range 33 is defined such that it is compatible with a safe operating area of the electronic switch unit 19. The evaluation unit 25 can further be designed such that the at least one tolerance range 33 is defined in accordance with a temperature of the electronic switch unit 19.

As an operating parameter C or operating parameters C, for example, a current strength of the load zone current flowing in the current path 20, a first derivative of the current strength of said load zone current after the time t, a magnitude of the load zone voltage applied between load zone lines 11, 13 and/or a first derivative of the magnitude of said load zone voltage after the time t is/are employed.

The control unit 27 is designed, in the normal operation of the load zone 3, to monitor the temporal characteristic of each operating parameter C for which a tolerance range 33 is defined, and to open the current path 20 by the actuation of the switch unit 19, if the temporal characteristic of an operating parameter C, in the time window T further to the closing of the current path 20, lies outside the tolerance range 33 thereof, or departs from the tolerance range 33 thereof.

The temperature sensor 29 is designed to capture a temperature of the electronic switch unit 19.

Figure 2:
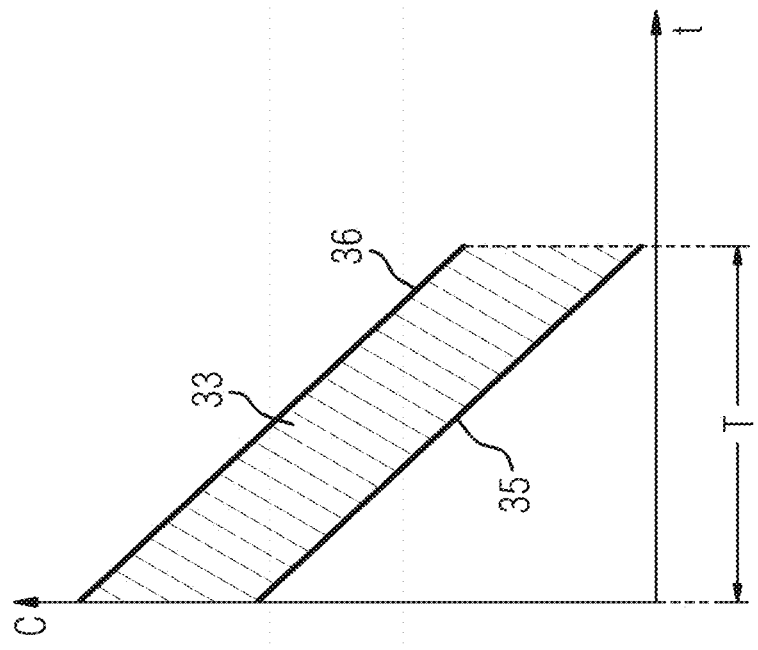
FIG. 2 shows a representation of a tolerance range for a temporal characteristic of an operating parameter of a load zone.

FIG. 2 shows a diagrammatic representation of a tolerance range 33 for a characteristic of an operating parameter C, in this case, for example, the current strength of the load zone current flowing in the current path 20, in accordance with the time t in the time window T further to the closing of the current path 20. The tolerance range 33 is delimited by a lower limit 35 and an upper limit 36, which are determined in consideration of the safe operating area of the electronic switch unit 19.

Figure 3:
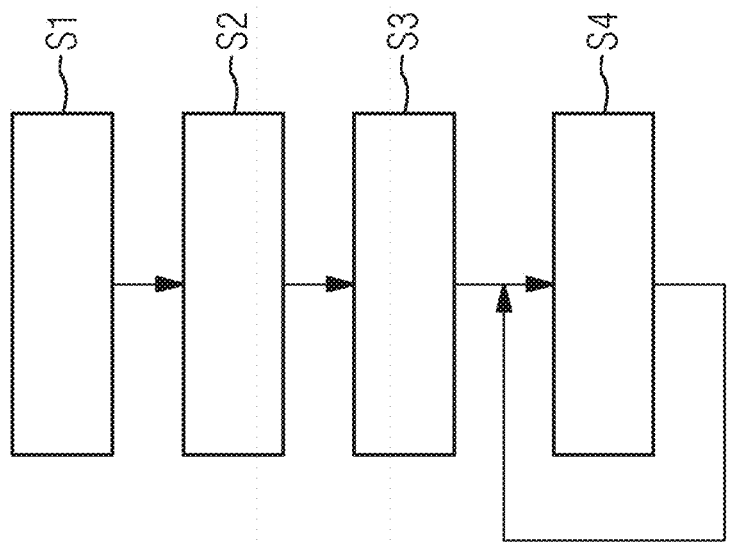
FIG. 3 shows a flow diagram for an example embodiment of a method according to the invention for operating a load zone on a power grid.

FIG. 3 shows a flow diagram for an example embodiment of a method according to the invention, having process steps S1 to S4, for operating the load zone 3 on the power grid 5 via the switch module 1 represented in FIG. 1.

In a first process step S1, a time window T is defined.

In a second process step S2, in a set-up operation of the load zone 3, at least one load profile is captured via the measuring unit 21 and is saved via the storage unit 23, wherein each load profile documents a temporal characteristic of a load zone current which flows in the current path 20, or of a load zone voltage which is present between the load zone lines 11, 13, in the time window T further to the closing of the current path 20.

In a third process step S3, the evaluation unit 25, based upon the at least one load profile, defines a tolerance range 33 for the temporal characteristic of at least one operating parameter C of the load zone 3 in the time window T. In particular, each tolerance range 33 is defined such that it is compatible with a safe operating area of the electronic switch unit 19 and, moreover, can be defined in accordance with a temperature of the electronic switch unit 19. As an operating parameter C or operating parameters C, for example, a current strength of the load zone current flowing in the current path 20, a first derivative of the current strength of said load zone current after the time t, a magnitude of the load zone voltage applied between load zone lines 11, 13 and/or a first derivative of the magnitude of said load zone voltage after the time t is/are employed.

In a fourth process step S4, in the normal operation of the load zone 3, in the time window T further to the closing of the current path 20, the load zone current flowing in the current path 20 and the load zone voltage which is applied between the load zone lines 11, 13, according to the time t, are measured via the measuring unit 21, and a temperature of the electronic switch unit 19 is measured via the temperature sensor 29. Moreover, the control unit 27 monitors the temporal characteristic of each operating parameter C for which a tolerance range 33 has been defined in the third process step S3, in the time window T further to the closing of the current path 20, and the current path 20 is opened, if the temporal characteristic of an operating parameter C, in the time window T further to the closing of the current path 20, lies outside the tolerance range 33 thereof or departs from the tolerance range 33 thereof. In the normal operation of the load zone 3, the fourth process step S4 is repeated after each closing of the current path 20.

Although the invention has been illustrated and described in greater detail with reference to preferred example embodiments, the invention is not limited by the examples disclosed, and further variations can be inferred herefrom by a person skilled in the art, without departing from the scope of protection of the invention.

The invention claimed is:

1. A method for operating a load zone on a power grid, comprising:
    defining a time window;
    capturing and saving, in a set-up operation of the load zone, at least one load profile, the at least one load profile documenting a temporal characteristic of at least one of
        a load zone current flowing in a current path connecting the load zone to the power grid, and
        a load zone voltage between an electrical potential of the current path and a reference potential in the time window, further to closing of the current path;
    defining, based upon the at least one load profile, a tolerance range for the temporal characteristic of at least one operating parameter of the load zone within the time window;
    monitoring, during normal operation of the load zone, the temporal characteristic of the at least one operating parameter in the time window, further to the closing of the current path; and
    opening the current path upon the monitoring, in the time window further to the closing of the current path, indicating the temporal characteristic of an operating parameter lies outside a tolerance range or departs from the tolerance range.

2. The method of claim 1, wherein a current strength of the load zone current is employed as an operating parameter of the at least one operating parameters.

3. The method of claim 2, wherein a first derivative of the current strength, of the load zone current after the time, is employed as an operating parameter of the at least one operating parameters.

4. The method of claim 2, wherein the time window is shorter than 100 µs.

5. The method of claim 2, wherein the current path is opened during the opening, and closed, via an electronic switch unit.

6. The method of claim 5, wherein at least one tolerance range is defined, in the defining of the tolerance range, as compatible with a safe operating area of the electronic switch unit.

7. The method of claim 6, wherein a temperature of the electronic switch unit is captured, and wherein at least one tolerance range is defined, in the defining of the tolerance range, in accordance with the temperature of the electronic switch unit.

8. The method of claim 5, wherein a temperature of the electronic switch unit is captured, and wherein at least one tolerance range is defined, in the defining of the tolerance range, in accordance with the temperature of the electronic switch unit.

9. The method of claim 1, wherein a magnitude of the load zone voltage is employed as an operating parameter of the at least one operating parameters.

10. The method of claim 9, wherein a first derivative of the magnitude, of the load zone voltage after the time, is employed as an operating parameter of the at least one operating parameters.

11. The method of claim 1, wherein the time window is shorter than 100 µs.

12. The method of claim 1, wherein the current path is opened during the opening, and closed, via an electronic switch unit.

13. The method of claim 12, wherein at least one tolerance range is defined, in the defining of the tolerance range, as compatible with a safe operating area of the electronic switch unit.

14. The method of claim 13, wherein a temperature of the electronic switch unit is captured, and wherein at least one tolerance range is defined, in the defining of the tolerance range, in accordance with the temperature of the electronic switch unit.

15. The method of claim 12, wherein a temperature of the electronic switch unit is captured, and wherein at least one tolerance range is defined, in the defining of the tolerance range, in accordance with the temperature of the electronic switch unit.

16. A switch module for operating a load zone on a power grid, the switch module comprising:
    an actuatable electronic switch unit designed to open and close a current path between the load zone and the power grid;
    a measuring unit designed to, in a time window further to closing of the current path, capture at least one of a temporal characteristic of a load zone current flowing in the current path and a temporal characteristic of a load zone voltage between an electrical potential of the current path and a reference potential;
    a storage unit designed to save at least one load profile, captured by the measuring unit, documenting a temporal characteristic of the load zone current or the load zone voltage in the time window further to the closing of the current path, in a set-up operation of the load zone;
    an evaluation unit designed, based upon the at least one load profile, to define a tolerance range for the temporal characteristic of at least one operating parameter of the load zone within the time window; and
    a control unit, actuatable via the switch unit, designed to, in normal operation of the load zone, monitor the temporal characteristic of each operating parameter of the at least one operating parameter for which a tolerance range is defined, and to open the current path by actuation of the switch unit upon the temporal characteristic of an operating parameter, in the time window further to the closing of the current path, lying outside the tolerance range or departing from the tolerance range.

17. The switch module of claim 16, wherein the evaluation unit is designed to define at least one tolerance range, compatible with a safe operating area of the electronic switch unit.

18. The switch module of claim 17, further comprising:
    a temperature sensor designed to capture a temperature of the electronic switch unit, wherein the evaluation unit is designed to define at least one tolerance range, in accordance with the temperature of the electronic switch unit.

19. A power grid comprising the switch module of claim 11.

20. The switch module of claim 16, further comprising:
a temperature sensor designed to capture a temperature of the electronic switch unit, wherein the evaluation unit is designed to define the at least one tolerance range, in accordance with the temperature of the electronic switch unit.

21. A power grid comprising the switch module of claim 10.

22. The power grid of claim 21, wherein the power grid is a DC power grid.

23. A switch module for operating a load zone on a power grid, the switch module comprising:
an actuatable electronic switch designed to open and close a current path between the load zone and the power grid;
a sensor designed to, in a time window further to closing of the current path, capture at least one of a temporal characteristic of a load zone current flowing in the current path and a temporal characteristic of a load zone voltage between an electrical potential of the current path and a reference potential;
a memory storage designed to save at least one load profile, captured by the sensor, documenting a temporal characteristic of the load zone current or the load zone voltage in the time window further to the closing of the current path, in a set-up operation of the load zone; and
at least one processor designed, based upon the at least one load profile, to define a tolerance range for the temporal characteristic of at least one operating parameter of the load zone within the time window; and
a controller, actuatable via the switch, designed to, in normal operation of the load zone, monitor the temporal characteristic of each operating parameter of the at least one operating parameter for which a tolerance range is defined, and to open the current path by actuation of the switch upon the temporal characteristic of an operating parameter, in the time window further to the closing of the current path, lying outside the tolerance range or departing from the tolerance range.

24. The switch module of claim 23, wherein the at least one processor is designed to define at least one tolerance range, compatible with a safe operating area of the electronic switch.

25. The switch module of claim 23, further comprising:
a temperature sensor designed to capture a temperature of the electronic switch, wherein the at least one processor is designed to define the at least one tolerance range, in accordance with the temperature of the electronic switch.

26. A power grid comprising the switch module of claim 23.

* * * * *